Dec. 31, 1968  Y. PELENC ET AL  3,419,802
APPARATUS FOR CURRENT MEASUREMENT BY
MEANS OF THE FARADAY EFFECT
Filed April 11, 1966
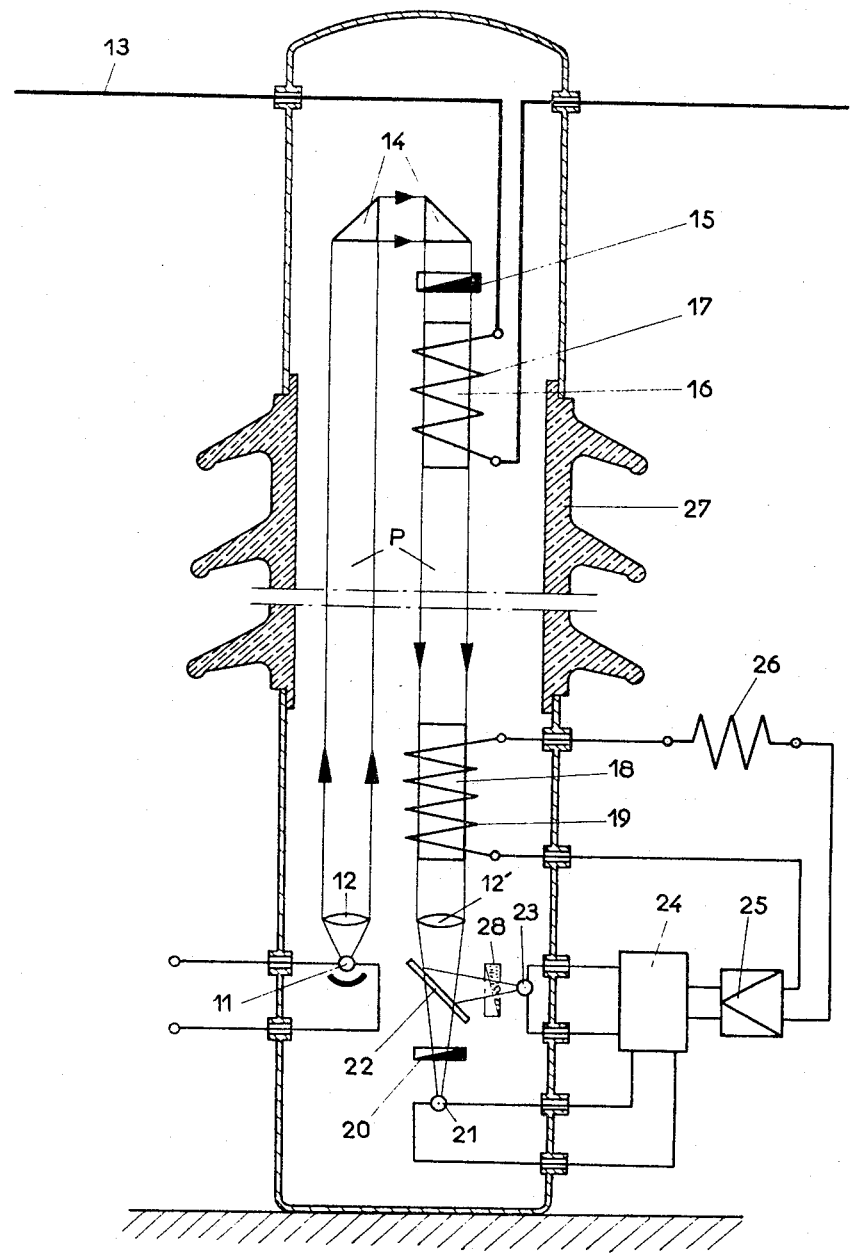

3,419,802
APPARATUS FOR CURRENT MEASUREMENT BY MEANS OF THE FARADAY EFFECT
Yves Pelenc, la Tronche, and Georges Bernard, Grenoble, France, assignors to Etablissements Merlin & Gerin Societe Anonyme, Grenoble, France
Filed Apr. 11, 1966, Ser. No. 541,629
Claims priority, application France, Apr. 10, 1965, 12,789; Mar. 3, 1966, 51,961
4 Claims. (Cl. 324—96)

For measuring currents in high-voltage conductors, conventional magnetic transformers have hitherto been used. However, the use of very high working voltages, for example above 400,000 volts, requires the use of a conventional transformer at a prohibitive price, in view of the necessity for insulating these voltages. In order to eliminate this drawback, it has already been proposed (in an article entitled, "Current Measurement by Means of the Faraday effect" in the "Engineers Digest" of December 1956, vol. 17, page 499) to use a light beam emitted by a source which is near the ground and which is polarized by a polarizer. The plane of polarization of this beam undergoes a rotation when the beam passes through a suitable transparent magneto-optically active body, such as a heavy flint, located near a conductor carrying a high voltage in a magnetic field created by the current to be measured which flows in this conductor. Faraday discovered that certain transparent isotropic bodies, liquids or solids, placed in a magnetic field, cause a rotation of the plane of polarization of a light beam which passes therethrough parallel to the direction of the magnetic field. The rotation is particularly great for bodies having a large refraction dispersion, such as flints. The rotation of the plane of polarization is proportional to the magnetic field created by a current flowing through a coil surrounding the transparent body. The beam leaving the body is redirected towards the ground, where it passes through a second polarizer or analyzer, behind which there is a photo-electric cell or a photomultiplier, which measures the light intensity coming from the analyzer. A suitable arrangement of the polarization axes of the polarizer enables a Faraday effect modulation of the beam flux to be produced which is collected by the photo-electric cell. By measuring the output signal of the photo-electric cell, one obtains as indirect measure of the current flowing in the high-voltage conductor and giving rise to the magnetic field, which produces the rotatory magnetic polarization.

However, this solution is to some extent affected by the slow drift of the optical and electrical devices used. Thus, the ageing of the source (lamp) of the detector (photomultiplier, amplifier) and of the secondary load (oscilloscope) supplied by the amplifier, introduce a proportional error into the measuring result and this error is difficult to accept.

It is an object of the invention to provide a current measuring device which is not affected by the faults caused by ageing and the like and in which the current can be measured by means of a zero method, enabling a high measuring accuracy to be achieved.

This and other objects and advantages will become apparent upon reading of the following description which refers to the annexed drawing showing schematically and by way of example only a measuring device according to the invention.

A light source 11 emits a visible, infrared or ultraviolet beam. The source is preferably located at the side at which the measurement is made at a potential equal to, or near that of, earth. The transmitted beam P passes through an optical system 12 towards a high-voltage conductor 13, the current of which is to be measured. A system of prisms 14 deflects the beam towards a polarizer 15 which may also be mounted between the lens 12 and the prisms 14. The polarized beam passes then through a transparent magneto-optically active body 16 located in an axial magnetic field created by a coil 17 carrying a current $i_1$, flowing in the conductor 13, or a proportional current. Under the action of the magnetic field, the plane of polarization undergoes, inside the body 16, which has a high Verdet's constant and which may be, for example, a heavy flint, an angular rotation which is proportional to the intensity of the magnetic field produced by the current which is proportional or equal to that flowing in the conductor 13. This effect is known as magnetic rotatory polarization or Faraday effect.

At a potential near earth, this rotation is measured by a compensating or zero method. The beam coming from the magnetic rotation device of the polarization plane 16 passes through a second magnetic rotation device 18 for the plane of polarization, similar to the device 16, and placed in the magnetic field created by a coil 19 whose direction is parallel to that of the light rays. The compensating method is based on the fact that, if the two rotations are equal and in opposite directions, the emerging beam is polarized in the same plane as the beam entering the first rotating device 16 and the secondary current in the coil 19 is therefore proportional to the current flowing in the conductor 13. The operation is similar to the functioning of a conventional transformer. The light flux is comparable to the magnetic flux of an electro-magnetic transformer, the coil 17 presents the primary ampere-turns and the coil 19 the secondary ampere-turns. Any difference, however small, between the primary and secondary ampere-turns results in a slight rotation of the plane of polarization of the beam emerging from the rotating device 18, in one direction or the other relative to the initial orientation. This rotation is detected by an analyzer 20 followed by a photo-electric cell 21, an optical system focussing the beam. A semi-reflecting or light dividing plate 22 deflects a part of the beam towards a second photoelectric cell 23. The measured difference between the signals emitted by the cells 21 and 23, illuminated, respectively, by the partial beams transmitted and reflected by the plate, is elaborated in balancing device 24 and supplies a secondary signal which is free from interferences with the light beam. This signal is electronically amplified in 25 and produces a current $i_2$ which supplies the coil 19 and an external load 26 formed by the measuring apparatus, counters or relays. The operation is such that the amplifier 25 acts on the secondary current $i_2$ in such a way that the difference between the primary and secondary ampere-turns has always the tendency to become zero.

In order that the photo-electric detector always receives a signal which enables the amplifier 25 to be controlled, there must always exist under operation a small periodic difference between the primary and secondary ampere-turns. This small difference corresponds to the magnetising ampere-turns of a conventional electro-magnetic transformer.

The optical assembly will be preferably located inside a protecting chamber whose center portion 27 is insulated.

Preferably, a second analyzer 28 will be located between the plate 22 and the cell 23, whereby the sensitivity can be doubled.

The light intensity F of the beam P emerging from the analyzer 20 or 28 is related to the flux $F_o$ of the beam incident of the polarizer 15 by the equation:

$$F = F_o/2 \cos^2\alpha$$

where $\alpha$ is the angle between the axes of polarization of the polarizer 15 and the analyzer 20 or 28.

$F_o$ is, in fact, an erratic function of the time and the fluctuations come from various sources:

Mechanical, caused by shocks, wind, electro-dynamic effects, vibration of the optical parts and mainly of the lamp filament, electrical, caused by variations in the supply voltage of the light source, those resulting from the ageing of the lamp and of the electronic components, and the like.

After differentiating the term above, one obtains $$dF = d(F_o) + d(F_\alpha) = \frac{\cos 2\alpha}{2} dF_o - F_o \sin \alpha \cos \alpha \, d\alpha$$

and this term has a maximum for $$\alpha = \frac{\pi}{4} + k\frac{\pi}{2}$$

where $k$ is a whole number.

If $\alpha = \pi/4+$ one obtains $$dF_{\frac{\pi}{4}} = \tfrac{1}{4} dF_o - \frac{F_o}{2} d\alpha$$

If $\alpha = \pi/4 + \pi/2$ one obtains $$dF_{\frac{3\pi}{4}} = \tfrac{1}{4} dF_o + \frac{F_o}{2} d\alpha$$

Since the cells 21 and 23 are connected in opposition, one behind the analyzer whose axis of polarization forms an angle of 45° with that of the polarizer 15, and the other behind an analyzer at an angle of 135°, the amplifier 25 receives a signal proportional to:

$$dF = dF_{\frac{3\pi}{4}} - dF_{\frac{\pi}{4}} = \tfrac{1}{4} dF_o + \frac{F_o}{2} d\alpha - \left[ \tfrac{1}{4} dF_o - \frac{F_o}{2} d\alpha \right] = F_o d\alpha$$

Thus, the sensitivity has been doubled and the effects of undesirable influences have been completely eliminated.

By arranging the semi-reflecting plate 22 in such a way that the angle of incidence of the beam P is near Brewster's angle (approximately 55° for glass), the analyzer 28 may be omitted, and possibly also the analyzer 20, as explained hereinbefore.

We claim:

1. In a device for the measurement of an electrical current flowing in an aerial high-voltage conductor of the type comprising a device for modulating the intensity of a polarized light beam, a first Faraday effect device disposed in the vicinity of said conductor and including a first magneto-optically active body disposed to be traversed by said polarized light beam, first electrically conducting means excited by said current and creating a magnetic field in said first body to produce a rotation of the plane of polarization of said light beam, a second Faraday effect device located in the vicinity of the ground and comprising a second magneto-optically active body disposed to be traversed by the light beam emerging from said first body, second electrically conducting means excited by a compensating current and creating a magnetic field in said second body to produce a compensating rotation of the plane of polarization of said light beam in opposite direction to the direction of rotation produced in said first body, means including an electronic amplifier to produce said compensating current, optical dividing means to divide the polarized light beam emerging from said second body into two elementary light beams, a first photoelectric device collecting the light flux of the elementary light beam being transmitted by said dividing means, a second photo-electric device collecting the light flux of the elementary light beam being reflected by said dividing means, an electronic balancing device, said first and second photo-electric devices being electrically connected in opposition and to said balancing device, the output of said balancing device being connected to said amplifier.

2. A device as set forth in claim 1 comprising two analyzers, one for each of said elementary light beams.

3. A device as set forth in claim 1, in which said dividing means comprise a semi-reflecting plate disposed with respect to the incident polarized light beam approximately at Brewster's angle.

4. A device as set forth in claim 1 comprising a source of light emitting a light beam, a polarizer for polarizing said light beam, said polarizer being disposed between said source and said first body, a first analyzer disposed to be traversed by one of said elementary light beams and having a polarization axis including with the polarization axis of said polarizer an angle of approximately $$\frac{\pi}{4} + k\frac{\pi}{2}$$

where $k$ is a whole number and a second analyzer disposed to be traversed by the other of said elementary light beams and having a polarization axis including with said polarization axis of said polarizer an angle of $$\frac{3\pi}{4} = k\frac{\pi}{2}$$

References Cited

UNITED STATES PATENTS

| | | | |
|---|---|---|---|
| 3,324,393 | 6/1967 | Casey et al. | 324—96 |
| 3,363,174 | 1/1968 | Hudson et al. | 324—96 |

RUDOLPH V. ROLINEC, *Primary Examiner.*

C. F. ROBERTS, *Assistant Examiner.*

U.S. Cl. X.R.

350—151; 250—225